United States Patent
Takeda et al.

(10) Patent No.: US 11,812,433 B2
(45) Date of Patent: Nov. 7, 2023

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 243 days.

(21) Appl. No.: 16/764,480

(22) PCT Filed: Nov. 17, 2017

(86) PCT No.: PCT/JP2017/041560
§ 371 (c)(1),
(2) Date: May 15, 2020

(87) PCT Pub. No.: WO2019/097696
PCT Pub. Date: May 23, 2019

(65) Prior Publication Data
US 2020/0359371 A1 Nov. 12, 2020

(51) Int. Cl.
*H04W 72/21* (2023.01)
*H04L 1/1812* (2023.01)

(52) U.S. Cl.
CPC ........... *H04W 72/21* (2023.01); *H04L 1/1812* (2013.01)

(58) Field of Classification Search
CPC . H04W 72/0413; H04W 16/28; H04W 72/04; H04W 72/1284; H04W 72/0446; H04W 72/0453; H04W 72/046; H04W 72/1268; H04W 72/21; H04L 1/1812;
(Continued)

(56) References Cited

U.S. PATENT DOCUMENTS

| 8,442,022 B2* | 5/2013 | Seo ....................... H04L 5/0053 370/342 |
| 9,025,561 B2* | 5/2015 | Kawamura ............. H04L 5/005 370/330 |
| 11,005,631 B2* | 5/2021 | Takeda .................. H04W 72/04 |

(Continued)

FOREIGN PATENT DOCUMENTS

| JP | 2012516614 A | 7/2012 |
| JP | 2013-509053 A | 3/2013 |

(Continued)

OTHER PUBLICATIONS

International Search Report issued in Application No. PCT/JP2017/041560, dated Feb. 13, 2018 (5 pages).

(Continued)

*Primary Examiner* — Hanh N Nguyen
(74) *Attorney, Agent, or Firm* — Osha Bergman Watanabe & Burton LLP

(57) ABSTRACT

A terminal is disclosed including a processor that maps an encoded bit sequence of an uplink control information firstly in a layer direction of a resource of an uplink shared channel, secondly in a frequency direction of the resource, and thirdly in a time direction of the resource; and a transmitter that transmits the uplink control information in the resource. In other aspects, a radio communication method for a terminal and a base station are also disclosed.

4 Claims, 8 Drawing Sheets

(58) Field of Classification Search
CPC ....... H04L 5/0023; H04L 1/16; H04L 1/1664; H04L 5/0053; H04B 7/0413
See application file for complete search history.

(56) References Cited

U.S. PATENT DOCUMENTS

| | | | |
|---|---|---|---|
| 11,445,530 B2* | 9/2022 | Yoshimura | H04W 72/1268 |
| 2010/0239040 A1 | 9/2010 | Beluri et al. | |
| 2011/0170625 A1 | 7/2011 | Blankenship et al. | |
| 2011/0229500 A1 | 9/2011 | Biggadike et al. | |
| 2011/0268080 A1 | 11/2011 | Luo et al. | |
| 2012/0269138 A1* | 10/2012 | Han | H04L 27/2697 370/329 |
| 2015/0156770 A1 | 6/2015 | Beluri et al. | |
| 2016/0142116 A1 | 5/2016 | Kim et al. | |
| 2019/0028313 A1* | 1/2019 | Takeda | H04L 27/2636 |
| 2021/0400698 A1* | 12/2021 | Wu | H04L 5/0055 |

FOREIGN PATENT DOCUMENTS

| | | |
|---|---|---|
| JP | 2014-209750 A | 11/2014 |
| JP | 2015-111933 A | 6/2015 |
| JP | 2017-175631 A | 9/2017 |
| WO | 2016/162803 A1 | 10/2016 |

OTHER PUBLICATIONS

Written Opinion issued in International Application No. PCT/JP2017/041560, dated Feb. 13, 2018 (5 pages).

3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).

Office Action issued in the counterpart Russian Patent Application No. 2020119231/07(032602), dated Feb. 2, 2021 (12 pages).

3GPP TSG RAN WG1 Meeting #90; R1-1713386 "CW to layer mapping and frequency domain interleaving" Qualcomm Incorporated; Prague, P.R. Czechia; Aug. 21-25, 2017 (16 pages).

Extended European Search Report issued in European Application No. 17931905.8, dated May 26, 2021 (8 pages).

3GPP TSG RAN WG1 Meeting 90bis; R1-1717388 "UCI embedding and PUSCH/PUCCH multiplexing" Intel Corporation; Prague, CZ; Oct. 9-13, 2017 (7 pages).

3GPP TSG RAN WG1 NR Ad-Hoc; R1-1700898 "Codeword-to-later mapping for DL and UL NR MIMO" Samsung; Spokane, USA; Jan. 16-20, 2017 (7 pages).

Office Action issued in Japanese Application No. 2019-553646; dated Jan. 11, 2022 (4 pages).

Office Action issued in Korean Application No. 10-2020-7015785; dated Jan. 21, 2022 (8 pages).

Office Action issued in Indian Application No. 202037020479; dated Mar. 16, 2022 (8 pages).

Office Action issued in Japanese Application No. 2019-553646; dated Aug. 9, 2022 (4 pages).

Office Action issued in Korean Application No. 10-2020-7015785; dated Aug. 22, 2022 (10 pages).

* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency, and so on (see non-patent literature 1). In addition, the specifications of LTE-A (LTE Advanced, and LTE Rel. 10, Rel. 11, Rel. 12, and Rel. 13) have been drafted for the purpose of achieving larger volume, further advancement, and so on of LTE (LTE Rel. 8 and Rel. 9).

Successor systems of LTE (for example, also referred to as "FRA (Future Radio Access)," "5G (5th generation mobile communication system)," "5G+ (plus)," "NR (New Radio)," "NX (New radio access)," "FX (Future generation radio access)," "LTE Rel. 14," "Rel. 15" (or later versions), and so on) are also under study.

In existing LTE systems (for example, LTE Rel. 8 to Rel. 13), a user terminal (UE (User Equipment)) transmits uplink control information (UCI), by using a UL data channel (for example, a PUSCH (Physical Uplink Shared Channel) and/or a UL control channel (for example, a PUCCH (Physical Uplink Control Channel))).

When transmission timing of uplink data and transmission timing of uplink control information (UCI) overlap each other, the UE performs transmission of the uplink data and the UCI by using an uplink shared channel (PUSCH). Transmission of UCI by using a PUSCH is also referred to as "UCI on PUSCH" ("piggyback on PUSCH"), "PUSCH piggyback," and so on.

For example, the UCI may include retransmission control information for DL data (also referred to as a "HARQ-ACK," an "ACK/NACK," an "A/N," and so on), a scheduling request (SR), and CSI (for example, periodic CSI (P-CSI), aperiodic CSI (A-CSI), semi-periodic CSI, and so on).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April 2010

SUMMARY OF INVENTION

Technical Problem

In the existing LTE systems (for example, LTE Rel. 8 to Rel. 13), when timings of transmission of uplink data (for example, a UL-SCH) and transmission of uplink control information (UCI) overlap each other, transmission of the uplink data and the UCI are performed by using an uplink shared channel (PUSCH) (UCI on PUSCH). Also in future radio communication systems (for example, LTE Rel. 14 (or later versions), 5G, or NR), uplink data and UCI are assumed to be transmitted by using a PUSCH as in the existing LTE systems.

However, in the future radio communication systems, when a configuration different from that of the existing LTE systems is applied, the question of how transmission of uplink control information using an uplink shared channel is controlled arises.

The present invention has been made in view of the above, and it is an object of the present invention to provide a user terminal and a radio communication method that allow appropriate communication even when uplink data and uplink control information are transmitted by using an uplink shared channel in future radio communication systems.

Solution to Problem

A user terminal according to one aspect of the present invention includes a transmitting section that transmits uplink data and uplink control information on an uplink shared channel, and a control section that first maps the uplink control information to one of a spatial domain, a frequency domain, and a time domain to thereby control mapping of the uplink control information to a plurality of layers.

Advantageous Effects of Invention

According to one aspect of the present invention, communication can be appropriately performed even when uplink data and uplink control information are transmitted by using an uplink shared channel in future radio communication systems.

DESCRIPTION OF EMBODIMENTS

Figure 1:
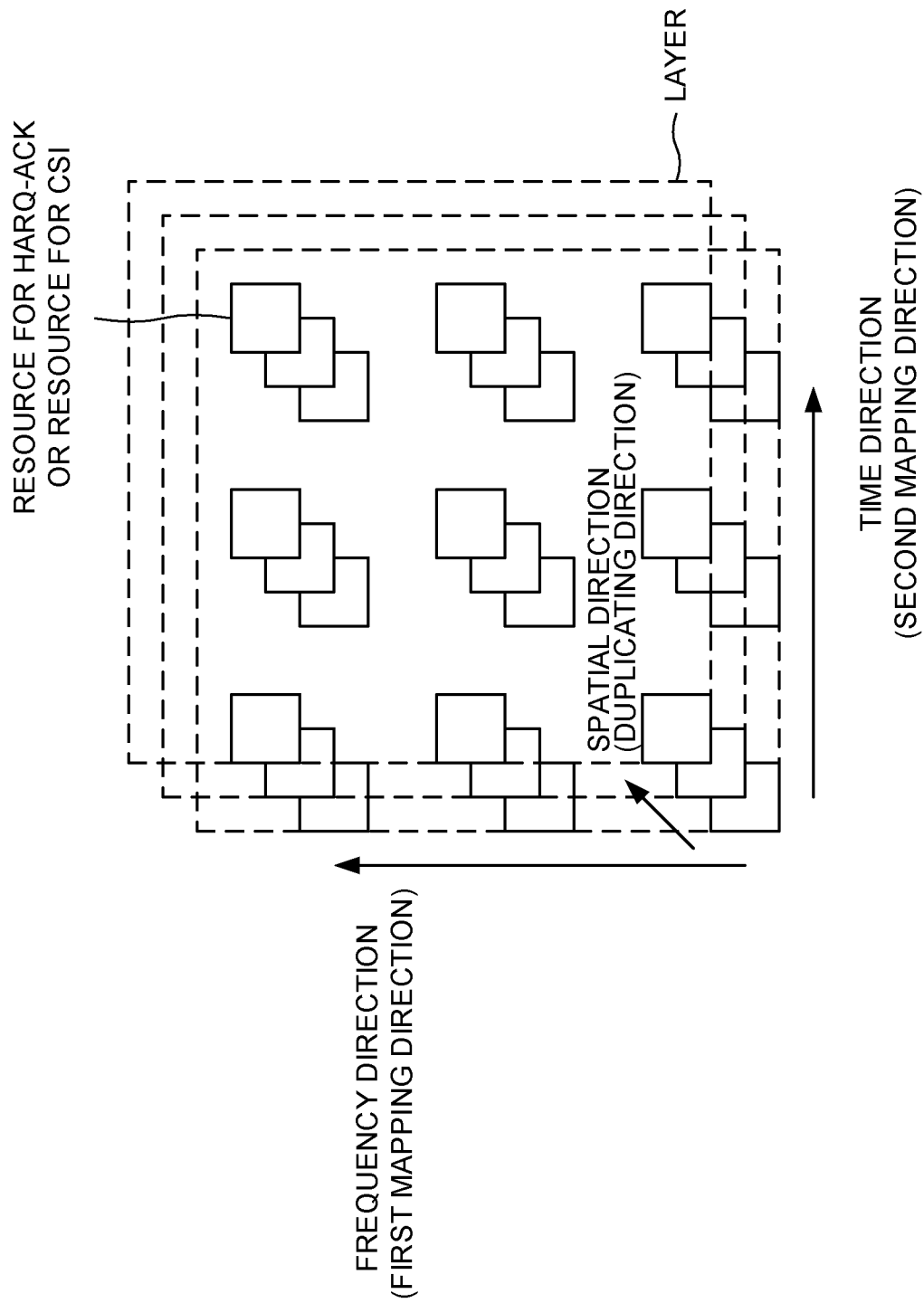
FIG. 1 is a diagram to show an example of a first mapping method.

In UL transmission of the existing LTE systems, when UCI transmission and uplink data (UL-SCH) transmission are generated at the same timing, a method of multiplexing and transmitting the UCI and the uplink data on a PUSCH (also referred to as "UCI piggyback on PUSCH," or "UCI on PUSCH") is supported. By using UCI on PUSCH, a low PAPR (Peak-to-Average Power Ratio) and/or low intermodulation distortion (IMD) can be achieved in UL transmission.

The support of UCI on PUSCH is also under study for UL transmission of the future radio communication systems (for example, LTE Rel. 14 (or later versions), 5G, or NR, and so on).

In UL (Uplink) MIMO (Multiple-Input Multiple-Output) (spatial multiplexing) of the existing LTE systems, mapping of a plurality of CWs (Code Words) to a respective plurality of layers is supported. DCI (Downlink Control Information) that schedules UL data may specify an MCS (Modulation and Coding Scheme) of each CW. Thus, a CW specific to each layer may be mapped, or an MCS (coding rate) specific to each layer may be applied.

For the future radio communication systems, UL MIMO for up to four layers is under study. Moreover, for UL MIMO, mapping of one CW to a plurality of layers is under study.

However, in the future radio communication systems, a mapping method of UCI on PUSCH for a plurality of layers has not been determined. Communication throughput, spectral efficiency, and so on may be deteriorated, unless an appropriate mapping method is used.

In view of this, the inventors of the present invention arrived at an idea of schemes of mapping UCI, in UCI on PUSCH using a plurality of layers.

Embodiments according to the present invention will be described below in detail with reference to the drawings. The radio communication methods according to the embodiments may be applied independently, or may be applied in combination.

When a UE and a radio base station perform UCI on PUSCH, the UE and the radio base station may perform a puncture process or a rate matching process for data on the PUSCH, in UCI resources.

In the rate matching process, the number of bits after coding (coded bits) is controlled in consideration of radio resources that can be actually used. In other words, control is performed by changing the coding rate of uplink data, according to the number of pieces of UCI to be multiplexed. Specifically, control is performed by avoiding mapping of data to multiplexing positions of the UCI.

In the puncture process, coding is performed based on an assumption that resources assigned for data can be used, and coded symbols are not mapped to resources that cannot be actually used (for example, resources for UCI) (a free resource is made). In other words, UCI is overwritten on a coding sequence of mapped uplink data. Specifically, data is mapped irrespective of whether the position is a multiplexing position of UCI, and data to be multiplexed with UCI is overwritten with the UCI.

As the resources for UCI (UCI resources) in PUSCH resources, for example, REs (Resource Elements) may be mapped in a spatial direction (spatial domain), a frequency direction (frequency domain), and a time direction (time domain). Alternatively, resources of other units (symbols, RBs (Resource Blocks), and so on) may be mapped in the spatial direction, the frequency direction, and the time direction.

Resources (for example, resources for a HARQ-ACK, resources for CSI, and so on) may be mapped for each type of UCI (for example, a HARQ-ACK, CSI, and so on).

The UE may determine the coding rate of UCI to be transmitted by using the PUCCH, based on the amount of resources used to transmit UCI (for example, the number of resource elements (REs), the number of bits of UCI, and a modulation order.

When the UE performs transmission of UCI on PUSCH, the UE needs to know how many resources (for example, resource elements (REs)) are necessary for the UCI. The UE may receive information used to determine the amount of resources (also referred to as "UCI resource-related information," "beta offset," "$\beta_{offset}$," and so on), and based on the beta offset, the UE may control the amount of resources for UCI to be transmitted on the PUSCH. For example, based on the beta offset, the number of symbols of a HARQ-ACK to be piggybacked using the PUSCH (the number of coded and modulated symbols per layer) is given.

Based on a beta offset value, transmission power of the PUSCH including the UCI may be determined.

A set including one or a plurality of beta offset values may be configured for a UE, using higher layer signaling (for example, RRC signaling).

The above set may be configured for each UCI type. Here, the UCI type may correspond to the detail of UCI. For example, the UCI type may be at least one of a HARQ-ACK, an SR, CSI, a CSI type, a CSI part, and so on.

For example, in PUSCH piggyback of a HARQ-ACK, three beta offset values may be defined for each set. These three values may correspond to respective cases where the number of bits of a HARQ-ACK $O_{ACK}$ falls within given values (for example, (1) $O_{ACK} \leq 2$, (2) $[3] \leq O_{ACK} \leq [11]$, and (3) $[11] < O_{ACK}$).

In PUSCH piggyback of CSI, four beta offset values may be defined for each set. These four values may correspond to respective cases where the number of bits of CSI part 1 $O_{CSI\_part1}$ or the number of bits of CSI part 2 $O_{CSI\_part2}$ fall within given value range, irrespective of whether the CSI type is 1 or 2 (for example, (A) $O_{CSI\_part1} \leq [11]$, (B) $[11] < O_{CSI\_part1}$, (C) $O_{CSI\_part2} \leq [11]$, and (D) $[11] < O_{CSI\_part2}$).

Note that the UE may determine the beta offset value for UCI, based on a given index related to the UCI. For example, the UE may use a correlation (mapping) between a beta offset value of a HARQ-ACK and a given index.

By using beta offset, coding rates in consideration of a target error rate according to a use case can be configured for each of the UCI (for example, a HARQ-ACK and CSI) and the UL data.

In the following description, higher layer signaling used for configuration of mapping may be, for example, any of RRC (Radio Resource Control) signaling, MAC (Medium Access Control) signaling, broadcast information, and so on, or a combination of these.

As the MAC signaling, for example, a MAC control element (MAC CE), a MAC PDU (Protocol Data Unit), and so on may be used. The broadcast information may be, for example, a master information block (MIB), a system information block (SIB), minimum system information (RMSI (Remaining Minimum System Information)), and so on.

(First Aspect)

In the first aspect, a UE transmits a HARQ-ACK, by means of UCI on PUSCH using a plurality of layers. The HARQ-ACK as used herein may be interpreted as coded information obtained by coding a HARQ-ACK. In other words, the UE may code a HARQ-ACK, and may map a bit sequence of the resultant coded information to resources for a HARQ-ACK.

<First Mapping Method>

In the first mapping method, a UE may map a HARQ-ACK to time resources and frequency resources in one layer, and then duplicate the mapped HARQ-ACK to another layer. In this manner, the UE may map the HARQ-ACK to a plurality of layers.

For example, a first mapping direction and a second mapping direction may be configured in advance from the frequency direction and the time direction, and the spatial direction may correspond to a duplicating direction. The UE may map a HARQ-ACK in the first mapping direction and then map the HARQ-ACK in the second mapping direction within one layer of resources assigned for a HARQ-ACK in a PUSCH, and then duplicate the mapped HARQ-ACK to another layer.

As shown in FIG. 1, the first mapping direction may correspond to the frequency direction, the second mapping direction may correspond to the time direction, and the duplicating direction may correspond to the spatial direction (frequency-first/time-second mapping).

In this case, the UE may map a bit sequence of a HARQ-ACK in the frequency direction of resources (UCI resources) for a HARQ-ACK, and repeatedly change its mapping positions to the time direction. In this manner, the UE may map the HARQ-ACK to a specific layer, and then duplicate the HARQ-ACK that is mapped to the specific layer to another layer. When the radio base station receives the PUSCH, the radio base station reads the bits in the order the bits were mapped, and thereby decodes the HARQ-ACK.

If UL MIMO employs N layers, the UE may map the HARQ-ACK to X layers out of the N layers. Here, X is equal to or less than N. A HARQ-ACK may not be mapped to all the layers.

The order of priority (mapping order) of the plurality of mapping directions may be other orders. For example, the first mapping direction may correspond to the time direction, the second mapping direction may correspond to the frequency direction, and the duplicating direction may correspond to the spatial direction (time-first/frequency-second mapping).

The first mapping direction, the second mapping direction, and the duplicating direction may be configured in advance from the spatial direction, the frequency direction, and the time direction. The UE may, in the resources assigned for a HARQ-ACK in a PUSCH, sequentially map the HARQ-ACK in the first mapping direction, map the HARQ-ACK in the second mapping direction, and then duplicate the mapped HARQ-ACK in the duplicating direction.

The resources for a HARQ-ACK may be mapped either locally or in a distributed manner, in each of the first mapping direction, the second mapping direction, and the duplicating direction.

Configuration information notified from the radio base station through higher layer signaling or the like may specify time resources and/or frequency resources for a HARQ-ACK within one layer. The UE may map a HARQ-ACK to one layer, in accordance with the configuration information.

A parameter notified from the radio base station through higher layer signaling or the like may be used for mapping. The UE may determine time resources and/or frequency resources for a HARQ-ACK by using this parameter and a given formula, and map a HARQ-ACK to the resources determined in one layer.

According to the first mapping method, by repeatedly transmitting one value of a HARQ-ACK in a plurality of layers, the effect of spatial diversity can be achieved. For example, the radio base station may add up a plurality of values corresponding in a plurality of layers, and thereby determine a value of a HARQ-ACK.

By duplicating a HARQ-ACK that is mapped to one layer, the UE need not perform mapping to each layer. Therefore, the scale of transmission processes can be reduced. The radio base station processes a value that is repeatedly transmitted in a plurality of layers. Therefore, the scale of receiving processes can be reduced.

<Second Mapping Method>

In the second mapping method, a UE may map a HARQ-ACK in the spatial direction, the frequency direction, and the time direction.

For example, the first mapping direction, the second mapping direction, and the third mapping direction may be configured in advance from the spatial direction, the frequency direction, and the time direction. The UE may sequentially map a HARQ-ACK in the first mapping direction, map the HARQ-ACK in the second mapping direction, and then map the HARQ-ACK in the third mapping direction, in the resources assigned for a HARQ-ACK in a PUSCH.

Figure 2:
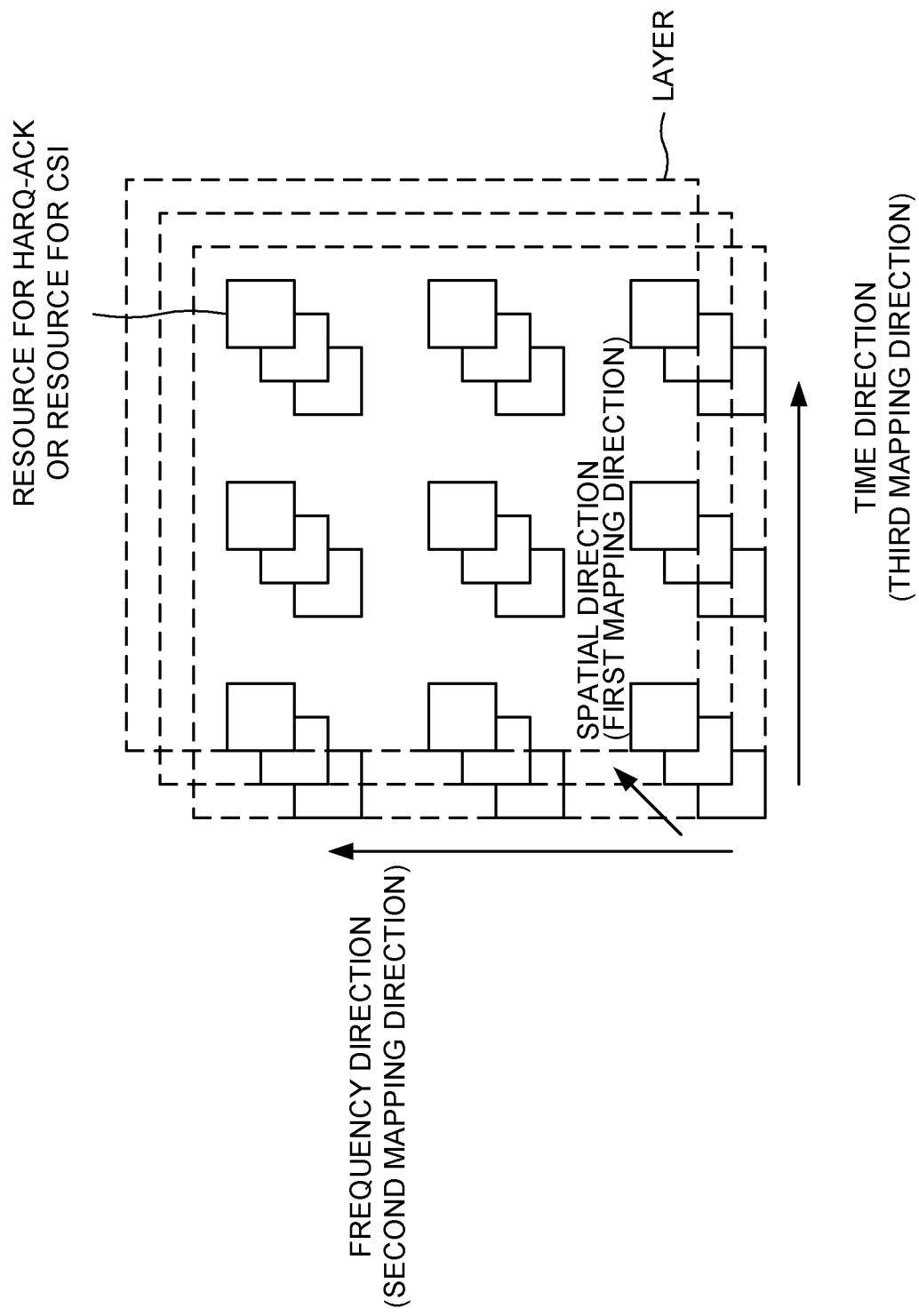
FIG. 2 is a diagram to show an example of a second mapping method.

For example, as shown in FIG. 2, the first mapping direction may correspond to the spatial direction, the second mapping direction may correspond to the frequency direction, and the third mapping direction may correspond to the time direction (space-first/frequency-second/time-third mapping).

In this case, the UE maps a bit sequence of a HARQ-ACK in the spatial direction of the resources (UCI resources) for a HARQ-ACK, repeatedly changes its mapping positions to the frequency direction, and then repeatedly changes the mapping positions to the time direction. In this manner, the UE maps the HARQ-ACK to a plurality of layers. When the radio base station receives the PUSCH, the radio base station reads the bits in the order the bits were mapped, and thereby decodes the HARQ-ACK.

If UL MIMO employs N layers, the UE may generate mapping of X layers out of the N layers. A HARQ-ACK may not be mapped to all the layers.

The order of priority (mapping order) of the plurality of mapping directions may be other orders. For example, the first mapping direction may correspond to the spatial direction, the second mapping direction may correspond to the time direction, and the third mapping direction may correspond to the frequency direction (space-first/time-second/frequency-third mapping). The spatial direction may correspond to the second mapping direction or the third mapping direction.

The resources for a HARQ-ACK may be mapped either locally or in a distributed manner, in each of the first mapping direction, the second mapping direction, and the third mapping direction.

Configuration information notified from the radio base station through higher layer signaling or the like may specify at least one of spatial resources, time resources, and frequency resources for a HARQ-ACK. The UE may map a HARQ-ACK to a plurality of layers, in accordance with the configuration information.

A parameter notified from the radio base station through higher layer signaling or the like may be used for mapping. The UE may determine at least one of spatial resources, time resources, and frequency resources for a HARQ-ACK in each of the plurality of layers by using this parameter and a given formula, and map a HARQ-ACK to the determined resources.

The first mapping method and the second mapping method are compared, using a case where X is 3, and a 10-bit coded HARQ-ACK (coded information) is mapped in one layer, for example. A UE using the first mapping method repeatedly transmits 10-bit coded information in three layers. In contrast, a UE using the second mapping method transmits 10-bit coded information in each layer, hence transmitting a total of 30-bit coded information.

Accordingly, in the second mapping method, the number of coded bits of a HARQ-ACK can be increased, and thus a coding gain of a HARQ-ACK can be increased, in comparison with the first mapping method. Therefore, the second mapping method can enhance HARQ-ACK performance.

<Method of Determining X>

A method in which a UE determines X will be described.

The UE may be configured with X through higher layer signaling.

The UE may determine X, based on N. The relationship between N and X may be configured in advance. For example, the relationship between N and X may be specified in a specification. For example, it may be specified that N is 4 when X is 2, and N is 2 when X is 1. N may be configured through higher layer signaling.

The UE may determine X, based on a beta offset value for a HARQ-ACK.

When dynamic selection of beta offset is employed, the UE may determine X, based on a set of beta offset values for a HARQ-ACK.

The UE may determine X by combining the plurality of pieces of information described above. In other words, the UE may determine X, based on at least one of higher layer signaling, N, beta offset for a HARQ-ACK, and a beta offset set for a HARQ-ACK.

According to the method of determining X described above, the number of layers necessary for transmission of a HARQ-ACK can be flexibly configured. When the UE determines X, based on another parameter, an overhead for notification can be reduced.

According to the first aspect, by transmitting a HARQ-ACK by means of UCI on PUSCH using a plurality of layers, resources for a HARQ-ACK can be increased, and thus performance of HARQ-ACK notification can be enhanced.

(Second Aspect)

In the second aspect, a UE transmits CSI, by means of UCI on PUSCH using a plurality of layers. The CSI as used herein may be interpreted as coded information obtained by coding CSI. In other words, the UE may code CSI, and may map a bit sequence of the resultant coded information to resources for CSI.

<First Mapping Method>

In the first mapping method, a UE may map CSI to time resources and frequency resources in one layer, and then duplicate the mapped CSI to another layer. In this manner, the UE may map the CSI to a plurality of layers.

For example, a first mapping direction and a second mapping direction may be configured in advance from the frequency direction and the time direction, and the spatial direction may correspond to a duplicating direction. The UE may map CSI in the first mapping direction and then map the CSI in the second mapping direction within one layer of resources assigned for CSI in a PUSCH, and then duplicate the mapped CSI to another layer.

As shown in FIG. 1, the first mapping direction may correspond to the frequency direction, the second mapping direction may correspond to the time direction, and the duplicating direction may correspond to the spatial direction (frequency-first/time-second mapping).

In this case, the UE may map a bit sequence of CSI in the frequency direction of resources for CSI (UCI resources), and repeatedly change its mapping positions to the time direction. In this manner, the UE may map the CSI to a specific layer, and then duplicate the CSI that is mapped to the specific layer to another layer. When the radio base station receives the PUSCH, the radio base station reads the bits in the order the bits were mapped, and thereby decodes the CSI.

If UL MIMO employs N layers, the UE may map the CSI to Y layers out of the N layers. Here, Y is equal to or less than N. CSI may not be mapped to all the layers.

The order of priority (mapping order) of the plurality of mapping directions may be other orders. For example, the first mapping direction may correspond to the time direction, the second mapping direction may correspond to the frequency direction, and the duplicating direction may correspond to the spatial direction (time-first/frequency-second mapping).

The first mapping direction, the second mapping direction, and the duplicating direction may be configured in advance from the spatial direction, the frequency direction, and the time direction. The UE may, in the resources assigned for CSI in a PUSCH, sequentially map the CSI in the first mapping direction, map the CSI in the second mapping direction, and then duplicate the mapped CSI in the duplicating direction.

The resources for CSI may be mapped either locally or in a distributed manner, in each of the first mapping direction, the second mapping direction, and the duplicating direction.

Configuration information notified from the radio base station through higher layer signaling or the like may specify time resources and/or frequency resources for CSI within one layer. The UE may map CSI to one layer, in accordance with the configuration information.

A parameter notified from the radio base station through higher layer signaling or the like may be used for mapping. The UE may determine time resources and/or frequency resources for CSI by using this parameter and a given formula, and map CSI to the resources determined in one layer.

According to the first mapping method, by repeatedly transmitting one value of CSI to a plurality of layers, the effect of spatial diversity can be achieved. For example, the radio base station may add up a plurality of values corresponding to a plurality of layers, and thereby determine a value of CSI.

By duplicating CSI that is mapped to one layer, the UE need not perform mapping to each layer. Therefore, the scale of transmission processes can be reduced. The radio base station processes a value that is repeatedly transmitted in a plurality of layers. Therefore, the scale of receiving processes can be reduced.

<Second Mapping Method>

In the second mapping method, a UE may map CSI in the spatial direction, the frequency direction, and the time direction.

For example, the first mapping direction, the second mapping direction, and the third mapping direction may be configured in advance from the spatial direction, the frequency direction, and the time direction. The UE may, in the resources assigned for CSI in a PUSCH, sequentially map the CSI in the first mapping direction, map the CSI in the second mapping direction, and then map the CSI in the third mapping direction.

For example, as shown in FIG. 2, the first mapping direction may correspond to the spatial direction, the second mapping direction may correspond to the frequency direction, and the third mapping direction may correspond to the time direction (space-first/frequency-second/time-third mapping).

In this case, the UE maps a bit sequence of CSI in the spatial direction of the resources (UCI resources) for CSI, repeatedly changes its mapping positions in the frequency direction, and then repeatedly changes the mapping positions in the time direction. In this manner, the UE maps the CSI to a plurality of layers. When the radio base station receives the PUSCH, the radio base station reads the bits in the order the bits were mapped, and thereby decodes the CSI.

If UL MIMO employs N layers, the UE may generate mapping of Y layers out of the N layers. CSI may not be mapped to all the layers.

The order of priority (mapping order) of the plurality of mapping directions may be other orders. For example, the first mapping direction may correspond to the spatial direction, the second mapping direction may correspond to the time direction, and the third mapping direction may correspond to the frequency direction (space-first/time-second/frequency-third mapping). The spatial direction may correspond to the second mapping direction or the third mapping direction.

The resources for CSI may be mapped either locally or in a distributed manner, in each of the first mapping direction, the second mapping direction, and the third mapping direction.

Configuration information notified from the radio base station through higher layer signaling or the like may specify at least one of spatial resources, time resources, and frequency resources for CSI. The UE may map the CSI to a plurality of layers, in accordance with the configuration information.

A parameter notified from the radio base station through higher layer signaling or the like may be used for mapping. The UE may determine at least one of spatial resources, time resources, and frequency resources for CSI in each of the plurality of layers by using this parameter and a given formula, and map the CSI to the determined resources.

The first mapping method and the second mapping method are compared, using a case where Y is 3, and a 10-bit coded CSI (coded information) is mapped in one layer, for example. A UE using the first mapping method repeatedly transmits 10-bit coded information in three layers. In contrast, a UE using the second mapping method transmits 10-bit coded information in each layer, hence transmitting a total of 30-bit coded information.

Accordingly, in the second mapping method, the number of coded bits of CSI can be increased, and thus a coding gain of CSI can be increased, in comparison with the first mapping method. Therefore, the second mapping method can enhance CSI performance.

<Method of Determining Y>

A method in which a UE determines Y will be described.

The UE may be configured with Y through higher layer signaling.

The UE may determine Y, based on N. The relationship between N and Y may be configured in advance. For example, the relationship between N and Y may be specified in a specification. For example, it may be specified that N is 4 when Y is 2, and N is 2 when Y is 1. N may be configured through higher layer signaling.

The UE may determine Y, based on a beta offset value for CSI.

When dynamic selection of beta offset is employed, the UE may determine Y, based on a set of beta offset values for CSI.

The UE may determine Y by combining the plurality of pieces of information described above. In other words, the UE may determine Y, based on at least one of higher layer signaling, N, beta offset for CSI, and a beta offset set for CSI.

According to the method of determining Y described above, the number of layers necessary for transmission of CSI can be flexibly configured. When the UE determines Y, based on another parameter, an overhead for notification can be reduced.

According to the second aspect, by transmitting CSI by means of UCI on PUSCH using a plurality of layers, resources for CSI can be increased, and thus performance of CSI notification can be enhanced.

(Other Aspects)

The first aspect and the second aspect may be combined.

There is a case where a HARQ-ACK and CSI are piggybacked at the same time in one PUSCH. In this case, a layer to which the HARQ-ACK is mapped and a layer to which the CSI is mapped may be the same, or may be different. X and Y may be the same, or may be different. For example, X and Y may be configured independently through higher layer signaling.

The UE may perform UCI on PUSCH for another UCI, such as an SR, by using the mapping method(s) of the first aspect and/or the second aspect. A plurality of parameters, out of a channel quality indicator (CQI), a rank indicator (RI), a precoding matrix indicator (PMI), and beam information (for example, BI (Beam Index)), may be independently mapped.

The mapping method for different types of UCI may be the same, or may be different. The number of layers (for example, X and Y) to which different types of UCI are mapped may be the same, or may be different. By configuring different numbers of layers for different types of UCI, performance (such as a target error rate) can be independently configured for notification of each type of UCI.

The UE may perform UCI on PUSCH for coded information obtained by joint coding of a plurality of types of UCI, by using the mapping method(s) of the first aspect and/or the second aspect.

In the PUSCH, a mapping method for data may be the same as or different from the mapping method for UCI (for example, a HARQ-ACK and/or CSI). For example, time-first/frequency-second mapping of the first mapping method may be used for data, and frequency-first/time-second mapping of the first mapping method may be used for a HARQ-ACK. For example, the second mapping method may be used for data, and the first mapping method may be used for a HARQ-ACK.

(Radio Communication System)

A structure of a radio communication system according to one embodiment of the present disclosure will be described below. In this radio communication system, communication is performed by using any of the radio communication methods according to the embodiments of the present disclosure described above, or a combination of these.

Figure 3:
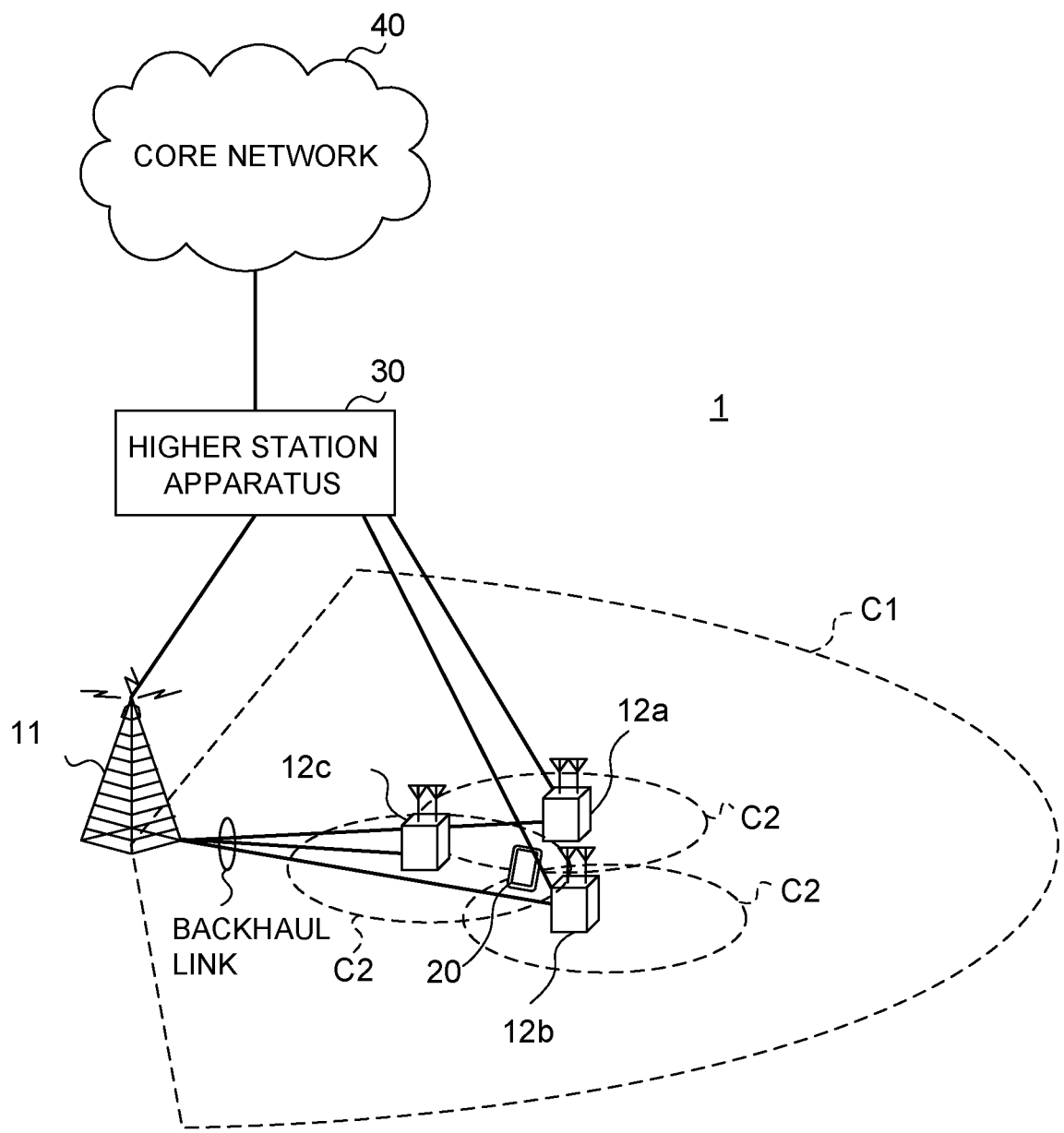
FIG. 3 is a diagram to show an example of a schematic structure of a radio communication system according to one embodiment.

FIG. 3 is a diagram to show an example of a schematic structure of a radio communication system according to one embodiment. A radio communication system 1 can adopt carrier aggregation (CA) and/or dual connectivity (DC) to group a plurality of fundamental frequency blocks (component carriers) into one, where the system bandwidth in LTE systems (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," or the like, or may be referred to as a "system for implementing these."

The radio communication system 1 includes a radio base station 11 that forms a macro cell C1 having a relatively wide coverage, and radio base stations 12 (12a to 12c) that form small cells C2, which are mapped within the macro cell C1 and are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminal 20 may apply CA or DC by using a plurality of cells (CCs).

Between the user terminals 20 and the radio base station 11, communication can be carried out using a carrier of a relatively low frequency band (for example, 2 GHz) and a narrow bandwidth (also referred to as an "existing carrier," a "legacy carrier," and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used with the radio base station 11 may be used. Note that the structure of the frequency band for use in each radio base station is by no means limited to these.

The user terminal 20 can perform communication by using time division duplex (TDD) and/or frequency division duplex (FDD) in each cell. In each cell (carrier), a single numerology may be employed, or a plurality of different numerologies may be employed.

Numerology may refer to a communication parameter used in transmission and/or reception of a certain signal and/or channel. For example, numerology may indicate at least one of a subcarrier spacing, a bandwidth, a symbol length, a cyclic prefix length, a subframe length, a TTI length, the number of symbols per TTI, a radio frame structure, a specific filtering process performed by a transmitter/receiver in the frequency domain, a specific windowing process performed by a transmitter/receiver in the time domain, and so on. For example, a case where subcarrier spacings of configured OFDM symbols are different and/or the numbers of OFDM symbols are different in a certain physical channel may be considered as a case having different numerologies.

The radio base station 11 and the radio base stations 12 (or between two radio base stations 12) may be connected in a wired manner (for example, using an optical fiber in compliance with the CPRI (Common Public Radio Interface), an X2 interface, and so on) or in a wireless manner.

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME), and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point," and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points," and so on. Hereinafter, the radio base stations 11 and 12 will be collectively referred to as "radio base stations 10," unless specified otherwise.

The user terminals 20 are terminals to support various communication schemes such as LTE and LTE-A, and may include not only mobile communication terminals (mobile stations) but also stationary communication terminals (stationary stations).

In the radio communication system 1, as radio access schemes, orthogonal frequency division multiple access (OFDMA) is employed in the downlink, and single carrier frequency division multiple access (SC-FDMA) and/or OFDMA is employed in the uplink.

OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and other radio access schemes may be used.

In the radio communication system 1, a downlink shared channel (PDSCH (Physical Downlink Shared Channel)), which is used by each user terminal 20 on a shared basis, a broadcast channel (PBCH (Physical Broadcast Channel)), downlink L1/L2 control channels, and so on, are used as downlink channels. User data, higher layer control information, SIBs (System Information Blocks), and so on are communicated in the PDSCH. Also, MIBs (Master Information Blocks) are communicated in the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel), and so on. Downlink control information (DCI) including PDSCH and/or PUSCH scheduling information is communicated in the PDCCH, for example.

Note that scheduling information may be notified in DCI. For example, DCI for scheduling DL data reception may be referred to as a "DL assignment," and DCI for scheduling UL data transmission may be referred to as a "UL grant."

The number of OFDM symbols to use for the PDCCH is communicated in the PCFICH. Transmission confirmation information (for example, also referred to as "retransmission control information," a "HARQ-ACK," an "ACK/NACK," and so on) of a HARQ (Hybrid Automatic Repeat reQuest) for the PUSCH is communicated in the PHICH. The EPDCCH is frequency-division-multiplexed with the PDSCH (downlink shared data channel) and used to communicate DCI and so on, like the PDCCH.

In the radio communication system 1, as uplink channels, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)), and so on are used. User data, higher layer control information, and so on are communicated in the PUSCH. Downlink radio quality information (CQI (Channel Quality Indicator)), transmission confirmation information, a scheduling request (SR), and so on are communicated in the PUCCH. By means of the PRACH, random access preambles for establishing connections with cells are communicated.

In the radio communication system 1, as downlink reference signals, a cell-specific reference signal (CRS), a channel state information-reference signal (CSI-RS), a demodulation reference signal (DMRS), a positioning reference signal (PRS), and so on are communicated. In the radio communication system 1, as uplink reference signals, a measurement reference signal (SRS (Sounding Reference Signal)), a demodulation reference signal (DMRS), and so on are communicated. Note that the DMRS may be referred to as a "user terminal-specific reference signal (UE-specific Reference Signal)." Communicated reference signals are not limited to these signals.

(Radio Base Station)

Figure 4:
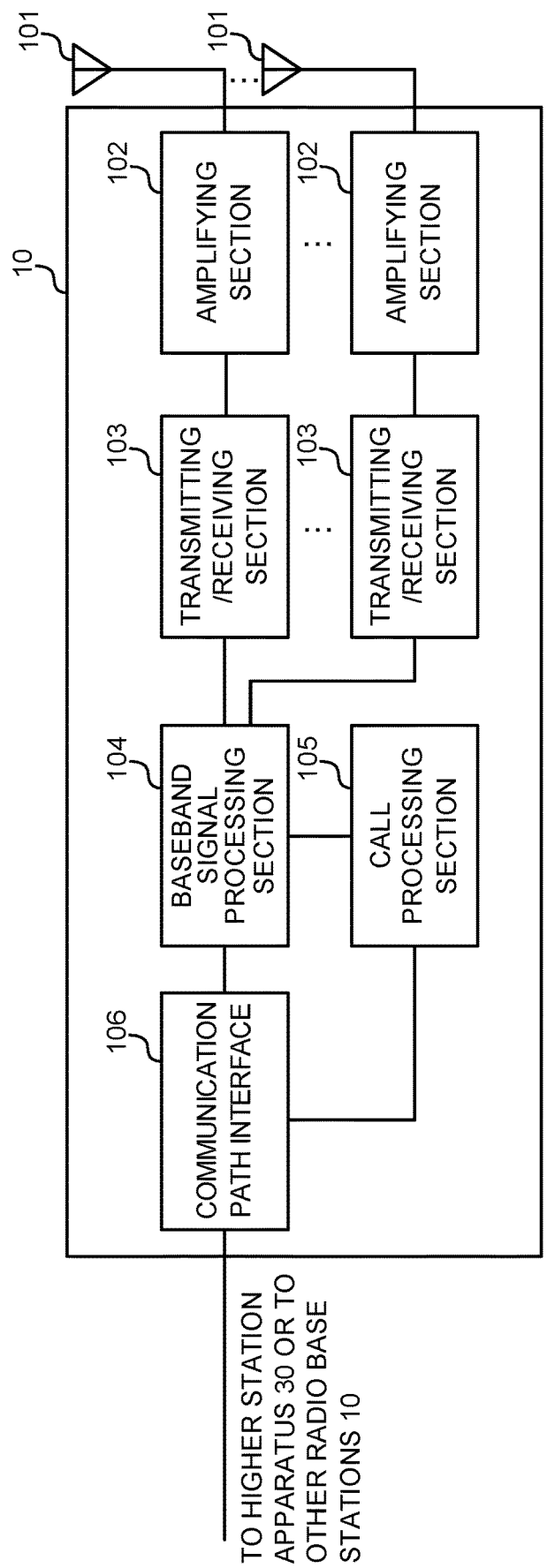
FIG. 4 is a diagram to show an example of an overall structure of a radio base station according to one embodiment.

FIG. 4 is a diagram to show an example of an overall structure of a radio base station according to one embodiment. A radio base station 10 includes a plurality of transmitting/receiving antennas 101, amplifying sections 102, transmitting/receiving sections 103, a baseband signal processing section 104, a call processing section 105, and a communication path interface 106. Note that the radio base station 10 may be configured to include one or more transmitting/receiving antennas 101, one or more amplifying sections 102, and one or more transmitting/receiving sections 103.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits, or pieces of transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into baseband signals through frequency conversion and output the baseband signals to the baseband signal processing section 104.

In the baseband signal processing section 104, user data that is included in the input uplink signals is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing, and so on) of communication channels, manages the state of the radio base station 10, and manages the radio resources.

The communication path interface 106 transmits and/or receives signals to and/or from the higher station apparatus 30 via a given interface. Also, the communication path interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 may receive UL data and uplink control information (UCI) on an uplink shared channel (for example, a PUSCH).

Figure 5:
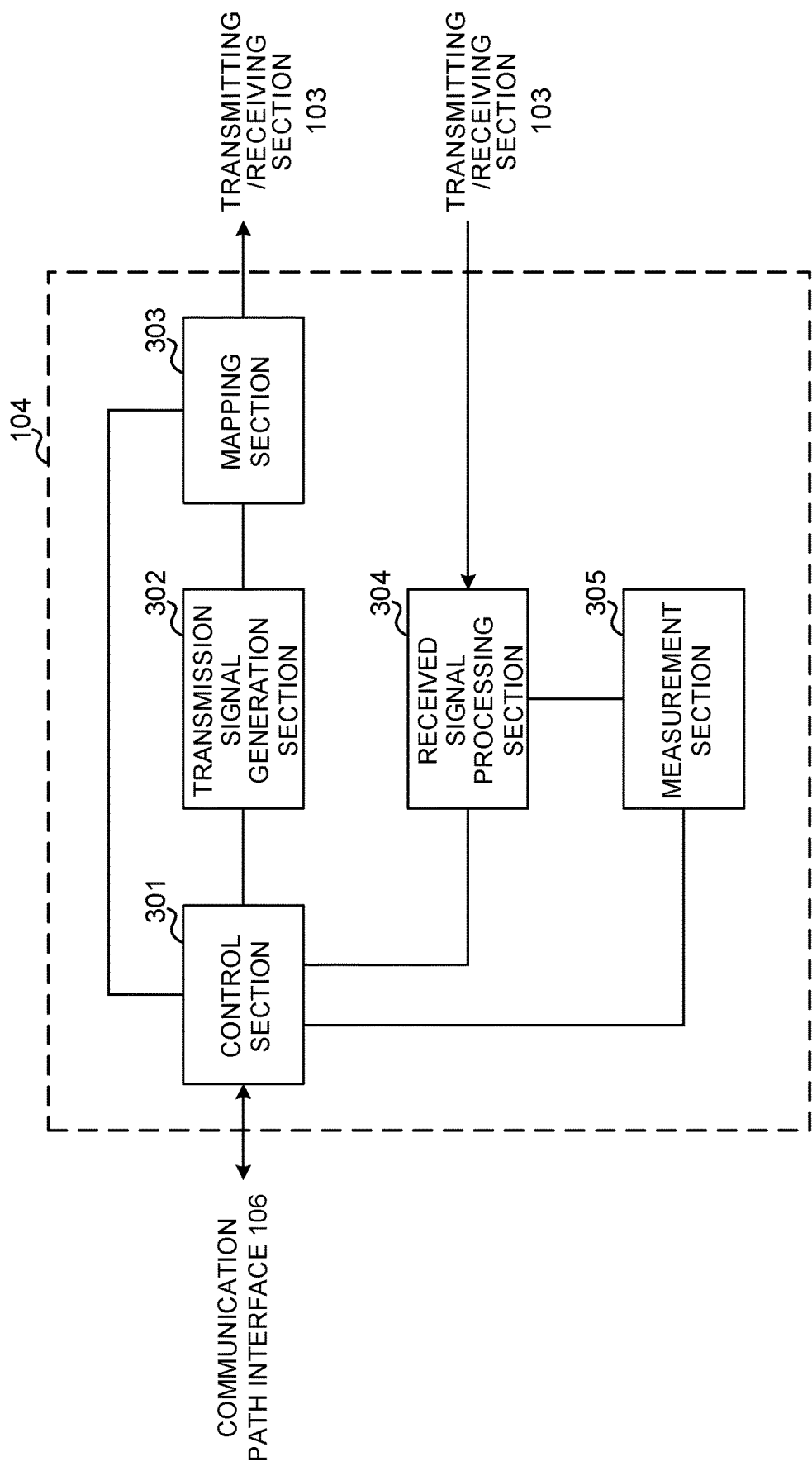
FIG. 5 is a diagram to show an example of a functional structure of the radio base station according to one embodiment.

FIG. 5 is a diagram to show an example of a functional structure of the radio base station according to one embodiment of the present disclosure. Note that, although this example primarily shows functional blocks that pertain to characteristic parts of the present embodiment, it may be assumed that the radio base station 10 includes other functional blocks that are necessary for radio communication as well.

The baseband signal processing section 104 includes at least a control section (scheduler) 301, a transmission signal generation section 302, a mapping section 303, a received signal processing section 304, and a measurement section 305. Note that these structures only need to be included in the radio base station 10, and a part or all of the structures may not be included in the baseband signal processing section 104.

The control section (scheduler) 301 controls the whole of the radio base station 10. The control section 301 can be constituted with a controller, a control circuit, or control apparatus that can be described based on general understanding of the technical field to which the present disclosure pertains.

The control section 301 controls, for example, signal generation of the transmission signal generation section 302, signal mapping of the mapping section 303, and so on. The control section 301 controls a signal receiving process of the received signal processing section 304, signal measurement of the measurement section 305, and so on.

The control section 301 controls scheduling (for example, resource assignment) of system information, a downlink data signal (for example, a signal transmitted on the PDSCH), a downlink control signal (for example, a signal transmitted on the PDCCH and/or the EPDCCH, transmission confirmation information, and so on). The control section 301 controls generation of a downlink control signal, a downlink data signal, and so on, based on the results determining whether retransmission control for an uplink data signal is required or not, for example.

The control section 301 performs control of scheduling of synchronization signals (for example, PSS (Primary Synchronization Signal)/SSS (Secondary Synchronization Signal)), downlink reference signals (for example, CRS, CSI-RS, and DMRS), and so on.

The control section 301 controls scheduling of an uplink data signal (for example, a signal transmitted on the PUSCH), an uplink control signal (for example, a signal transmitted on the PUCCH and/or the PUSCH, transmission confirmation information, and so on), a random access preamble (for example, a signal transmitted on the PRACH), an uplink reference signal, and so on.

The control section 301 may perform control of reception of UL data on an uplink shared channel (for example, a PUSCH) and uplink control information (UCI) piggybacked on the uplink shared channel. For example, the control section 301 may determine one set out of a plurality of sets of beta offset values configured for the user terminal 20. Then, based on a beta offset value selected from the one set, the control section 301 may determine the amount of resources for UCI transmission on the PUSCH.

The control section 301 may perform control of transmitting a given field included in DCI (UL grant), as the information for determining the above one set out of the above plurality of sets in the user terminal 20. The control section 301 may associate the above given field with start and/or end timing (symbol) of the PUSCH that is scheduled with a UL grant.

The transmission signal generation section 302 generates downlink signals (downlink control signals, downlink data signals, downlink reference signals, and so on), based on a command from the control section 301, and outputs the generated downlink signals to the mapping section 303. The transmission signal generation section 302 can be constituted with a signal generator, a signal generation circuit, or signal generation apparatus that can be described based on general understanding of the technical field to which the present disclosure pertains.

The transmission signal generation section 302 generates, for example, a DL assignment for notifying downlink data allocation information and/or a UL grant for notifying uplink data allocation information, based on a command from the control section 301. Both the DL assignment and the UL grant are DCI, and follow a DCI format. The downlink data signals are subjected to a coding process and a modulation process according to a coding rate, a modulation scheme, and so on determined based on channel state information (CSI) from each user terminal 20, for example.

The mapping section 303 maps the downlink signals generated in the transmission signal generation section 302 to given radio resources, based on a command from the control section 301, and outputs these to the transmitting/receiving sections 103. The mapping section 303 can be constituted with a mapper, a mapping circuit, or mapping apparatus that can be described based on general understanding of the technical field to which the present disclosure pertains.

The received signal processing section 304 performs a receiving process (for example, demapping, demodulation, decoding, and so on) on the received signals input from the transmitting/receiving sections 103. Here, the received signals are, for example, uplink signals transmitted from the user terminal 20 (uplink control signals, uplink data signals, uplink reference signals, and so on). The received signal processing section 304 can be constituted with a signal processor, a signal processing circuit, or signal processing apparatus that can be described based on general understanding of the technical field to which the present disclosure pertains.

The received signal processing section 304 outputs information decoded through the receiving process to the control section 301. For example, when a PUCCH including a HARQ-ACK is received, the HARQ-ACK is output to the control section 301. The received signal processing section 304 outputs the received signals and/or the signals after the receiving process to the measurement section 305.

The measurement section 305 conducts measurements with respect to the received signals. The measurement section 305 can be constituted with a measurer, a measurement circuit, or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signals. The measurement section 305 may conduct measurements with respect to reception power (for example, RSRP (Reference Signal Received Power)), reception quality (for example, RSRQ (Reference Signal Received Quality), SINR (Signal to Interference plus Noise Ratio), and SNR (Signal to Noise Ratio)), signal intensity (for example, RSSI (Received Signal Strength Indicator)), channel information (for example, CSI), and so on. The measurement results may be output to the control section 301.

(User Terminal)

Figure 6:
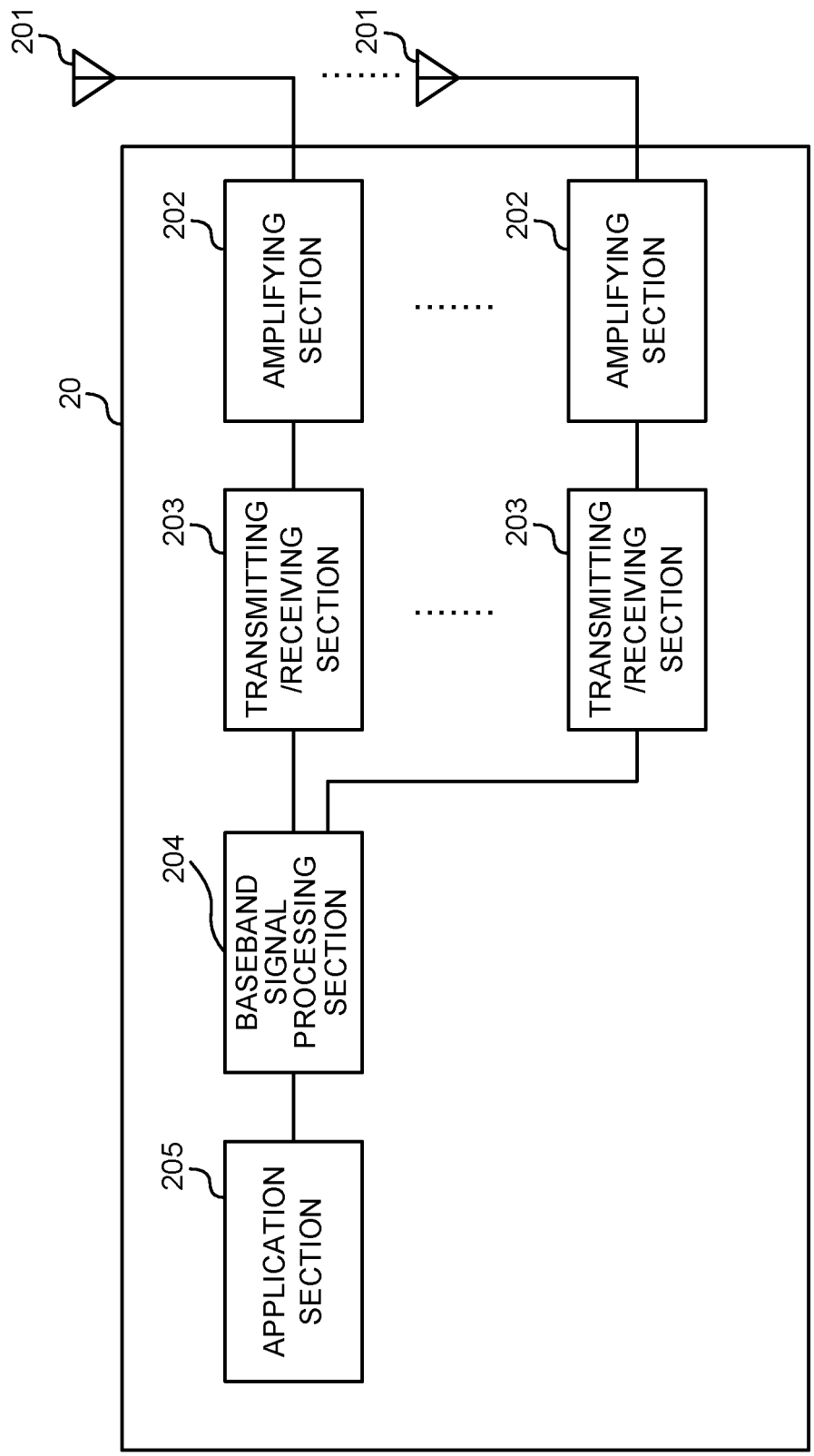
FIG. 6 is a diagram to show an example of an overall structure of a user terminal according to one embodiment.

FIG. 6 is a diagram to show an example of an overall structure of a user terminal according to one embodiment. Each user terminal 20 includes a plurality of transmitting/receiving antennas 201, amplifying sections 202, transmitting/receiving sections 203, a baseband signal processing section 204, and an application section 205. Note that the user terminal 20 may be configured to include one or more transmitting/receiving antennas 201, one or more amplifying sections 202, and one or more transmitting/receiving sections 203.

Radio frequency signals that are received in the transmitting/receiving antennas 201 are amplified in the amplifying sections 202. The transmitting/receiving sections 203 receive downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits, or pieces of transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. Broadcast information, out of the downlink data, may also be forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process, and so on, and the result is forwarded to each transmitting/receiving section 203.

The transmitting/receiving sections 203 convert the baseband signals output from the baseband signal processing section 204 to have radio frequency bands and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 may transmit uplink data and uplink control information (UCI, for example, a HARQ-ACK and CSI) on an uplink shared channel (for example, a PUSCH).

Figure 7:
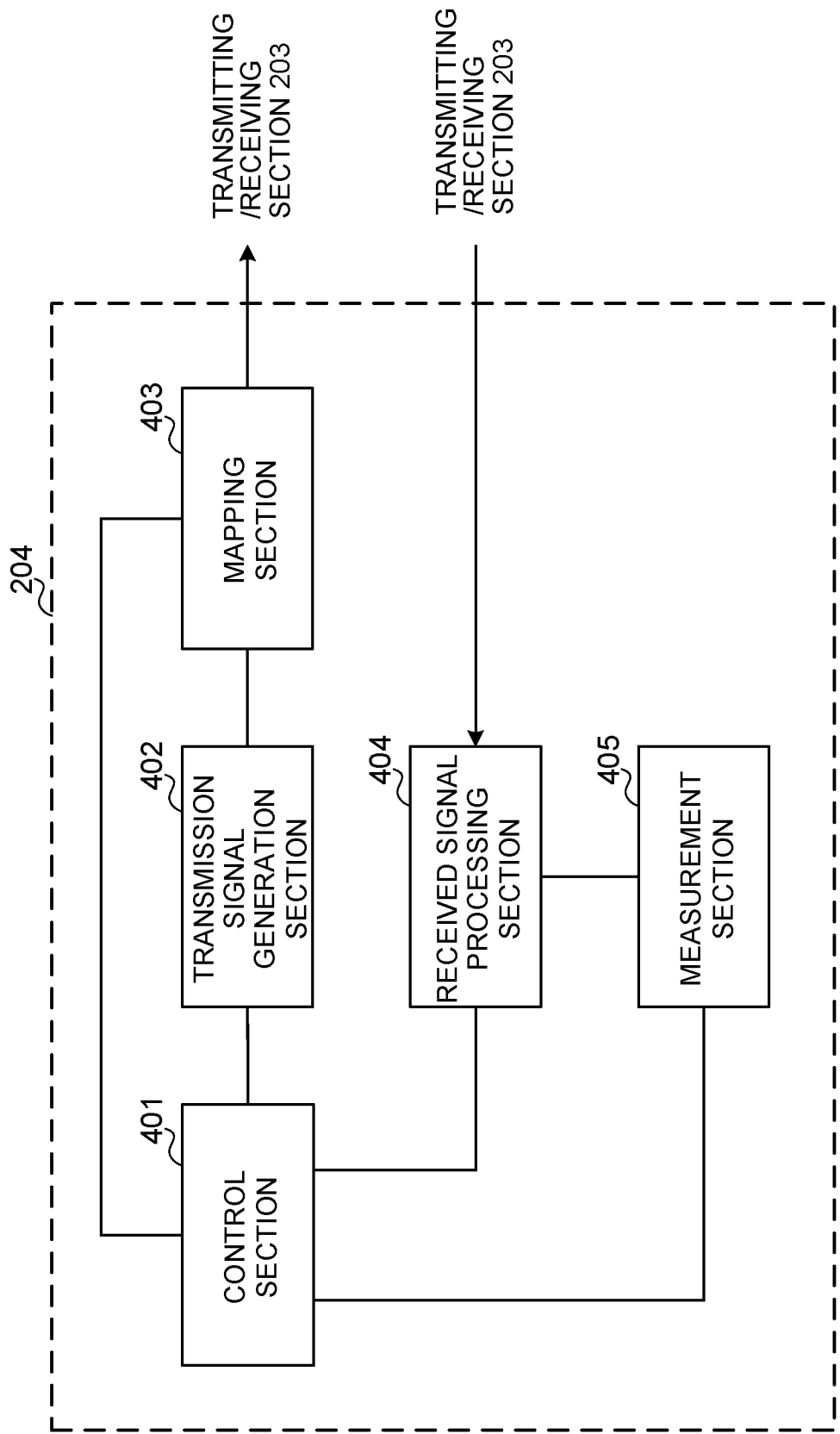
FIG. 7 is a diagram to show an example of a functional structure of the user terminal according to one embodiment.

FIG. 7 is a diagram to show an example of a functional structure of the user terminal according to one embodiment. Note that, although this example primarily shows functional blocks that pertain to characteristic parts of the present embodiment, it may be assumed that the user terminal 20 includes other functional blocks that are necessary for radio communication as well.

The baseband signal processing section 204 included in the user terminal 20 includes at least a control section 401, a transmission signal generation section 402, a mapping section 403, a received signal processing section 404, and a measurement section 405. Note that these structures only need to be included in the user terminal 20, and a part or all of the structures may not be included in the baseband signal processing section 204.

The control section 401 controls the whole of the user terminal 20. The control section 401 can be constituted with a controller, a control circuit, or control apparatus that can be described based on general understanding of the technical field to which the present disclosure pertains.

The control section 401 controls, for example, signal generation of the transmission signal generation section 402, signal mapping of the mapping section 403, and so on. The control section 401 controls a signal receiving process of the received signal processing section 404, signal measurement of the measurement section 405, and so on.

The control section 401 acquires the downlink control signals and the downlink data signals transmitted from the radio base station 10, through the received signal processing section 404. The control section 401 controls generation of an uplink control signal and/or an uplink data signal, based on the results determining whether retransmission control for the downlink control signal and/or the downlink data signal is required or not, for example.

When the control section 401 acquires various pieces of information notified from the radio base station 10 through the received signal processing section 404, the control section 401 may update parameter(s) used for performing control, based on the acquired information.

The transmission signal generation section 402 generates uplink signals (uplink control signals, uplink data signals, uplink reference signals, and so on), based on a command from the control section 401, and outputs the generated uplink signals to the mapping section 403. The transmission signal generation section 402 can be constituted with a signal generator, a signal generation circuit, or signal generation apparatus that can be described based on general understanding of the technical field to which the present disclosure pertains.

The transmission signal generation section 402 generates, for example, uplink control signals related to transmission confirmation information, channel state information (CSI), and so on, based on a command from the control section 401. The transmission signal generation section 402 also generates uplink data signals, based on a command from the control section 401. For example, when downlink control signals from the radio base station 10 include a UL grant, the transmission signal generation section 402 is given a command to generate uplink data signals from the control section 401.

The mapping section 403 maps the uplink signals generated in the transmission signal generation section 402 to radio resources, based on a command from the control section 401, and outputs these to the transmitting/receiving sections 203. The mapping section 403 can be constituted with a mapper, a mapping circuit, or mapping apparatus that can be described based on general understanding of the technical field to which the present disclosure pertains.

The received signal processing section 404 performs a receiving process (for example, demapping, demodulation, decoding, and so on) on the received signals input from the transmitting/receiving sections 203. Here, the received signals are, for example, downlink signals (downlink control signals, downlink data signals, downlink reference signals, and so on) transmitted from the radio base station 10. The received signal processing section 404 can be constituted with a signal processor, a signal processing circuit, or signal processing apparatus that can be described based on general understanding of the technical field to which the present disclosure pertains. Also, the received signal processing section 404 can constitute a receiving section according to the present disclosure.

The received signal processing section 404 outputs information decoded through the receiving process to the control section 401. The received signal processing section 404 outputs, for example, broadcast information, system information, RRC signaling, DCI, and so on to the control section 401. The received signal processing section 404 outputs the received signals and/or the signals after the receiving process to the measurement section 405.

The measurement section 405 conducts measurements with respect to the received signals. The measurement section 405 can be constituted with a measurer, a measurement circuit, or measurement apparatus that can be described based on general understanding of the technical field to which the present disclosure pertains.

For example, the measurement section 405 may conduct RRM measurement, CSI measurement, and so on, based on the received signals. The measurement section 405 may conduct measurements with respect to reception power (for example, RSRP), reception quality (for example, RSRQ, SINR, and SNR), signal intensity (for example, RSSI), channel information (for example, CSI), and so on. The measurement results may be output to the control section 401.

The control section 401 may perform control of transmission of UL data on an uplink shared channel (for example, a PUSCH) and uplink control information (UCI) piggybacked on the uplink shared channel.

The control section 401 may control mapping of uplink control information to a plurality of layers, by first mapping the uplink control information to one of a spatial domain (spatial direction), a frequency domain (frequency direction), and a time domain (time direction).

The control section 401 may map the uplink control information to one layer of the plurality of layers, and then duplicate the uplink control information mapped to the one layer to the plurality of layers (for example, the first mapping method).

The control section 401 may map a bit sequence of the uplink control information over the plurality of layers (for example, the second mapping method).

The control section 401 may determine the number of layers (for example, X and/or Y) to which the uplink control information is to be mapped, based on at least one of higher layer signaling, number of layers of spatial multiplexing (for example, N), beta offset for the uplink control information, and a beta offset set for the uplink control information.

The control section 401 may determine the number of layers to which retransmission control information (for example, a HARQ-ACK) is to be mapped, and the number of layers to which channel state information (for example, CSI) is to be mapped.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 8:
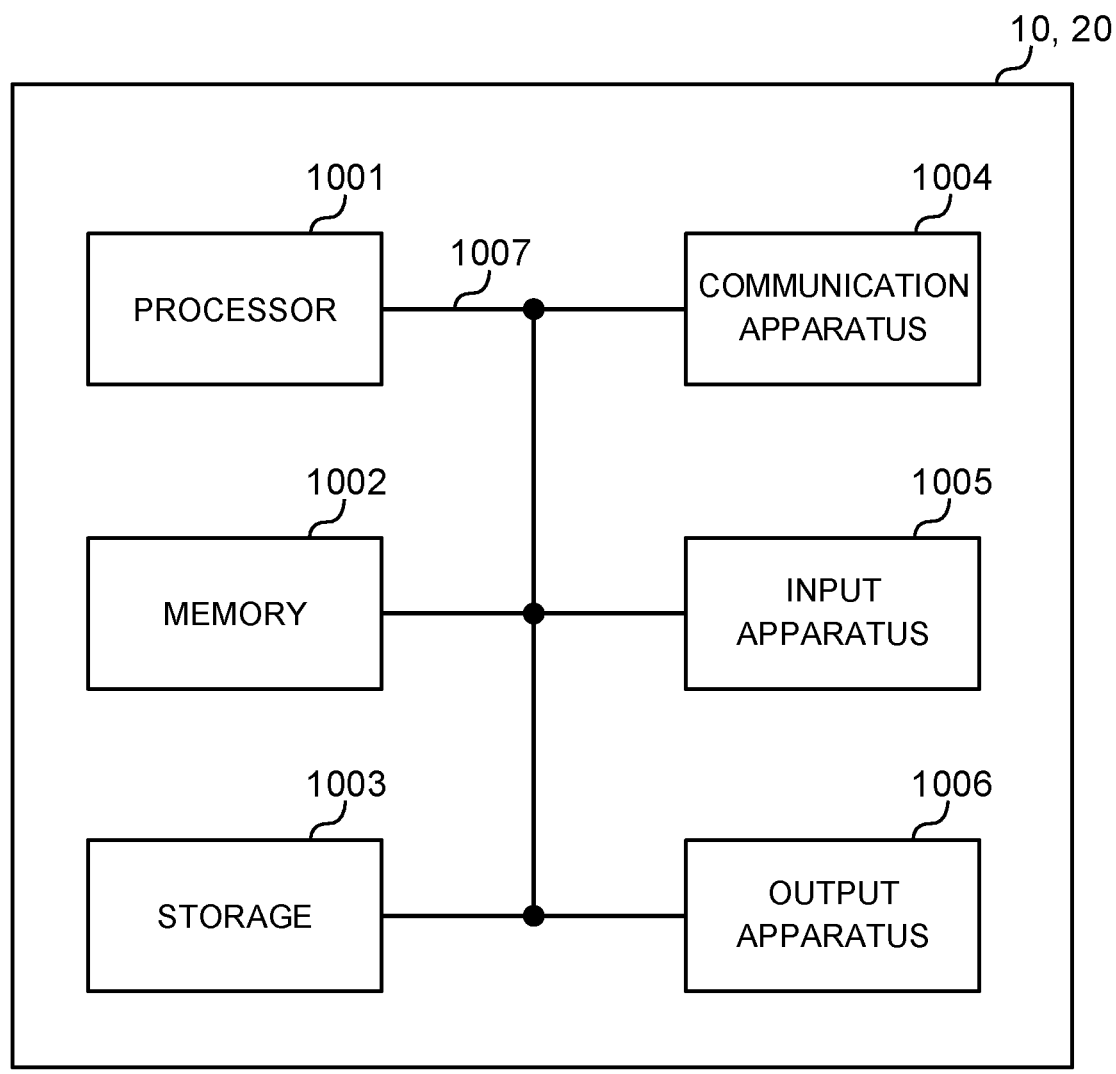
FIG. 8 is a diagram to show an example of a hardware structure of the radio base station and the user terminal according to one embodiment.

For example, a radio base station, a user terminal, and so on according to one embodiment of the present disclosure may function as a computer that executes the processes of the radio communication method of the present disclosure. FIG. 8 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or more of apparatuses shown in the drawings, or may be designed not to include part of apparatuses.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (read only memory), an EPROM (erasable programmable ROM), an EEPROM (electrically EPROM), a RAM (random access memory), and other appropriate storage media. The memory 1002 may be referred to as a "register," a "cache," a "main memory (primary storage apparatus)," and so on. The memory 1002 can store executable programs (program codes), software modules, and/or the like for implementing a radio communication method according to one embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency," and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (orthogonal frequency division multiplexing) symbols, SC-FDMA (single carrier frequency division multiple access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI," or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the assignment of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a "TTI," one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "regular TTI" (TTI in LTE Rel. 8 to Rel. 12), a "normal TTI," a "long TTI," a "regular subframe," a "normal subframe," a "long subframe," and so on. A TTI that is shorter than a normal TTI may be referred to as a "shortened TTI," a "short TTI," a "partial or fractional TTI," a "shortened subframe," a "short subframe," a "mini-slot," a "sub-slot," and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource assignment in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair," and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to given values, or may be represented in another corresponding information. For example, radio resources may be specified by given indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other names, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used herein are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell," and so on.

A base station can accommodate one or a plurality of (for example, three) cells (also referred to as "sectors"). When a base station accommodates a plurality of cells, the entire coverage area of the base station can be partitioned into a plurality of smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

Depending on a person skilled in the art, a mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled," and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the invention according to the present disclosure has been described in detail above, it should be obvious to a person skilled in the art that the invention according to the present disclosure is by no means limited to the embodiments described herein. The invention according to the present disclosure can be implemented with various corrections and in various modifications, without departing from the spirit and scope of the invention defined by the recitations of claims. Consequently, the description herein is provided only for the purpose of explaining examples, and should by no means be construed to limit the invention according to the present disclosure in any way.

What is claimed is:

1. A terminal comprising:
    a processor that:
        performs a first layer direction mapping that maps first coded bits of a Hybrid Automatic Repeat reQuest-Acknowledgement (HARQ-ACK) to first positions in a layer direction of resource elements of an uplink shared channel;
        performs a first frequency direction mapping that changes the first positions to a frequency direction of the resource elements and repeats the first layer direction mapping;
        repeats changing the first positions to a time direction of the resource elements and performing the first frequency direction mapping;
        determines second positions from among the resource elements available for second coded bit of data, based on the first positions of the mapped first coded bits, to avoid mapping the second coded bit to the first positions of the mapped first coded bits;
        performs a second layer direction mapping that maps the second coded bits to second positions in the layer direction;
        performs a second frequency direction mapping that repeats changing the second positions to the frequency direction and performing the second layer direction mapping; and
        repeats changing the second positions to the time direction and performing the second frequency direction mapping; and
    a transmitter that transmits the uplink shared channel.

2. A radio communication method for a terminal comprising:
    performing a first layer direction mapping that maps first coded bits of a Hybrid Automatic Repeat reQuest-Acknowledgement (HARQ-ACK) to first positions in a layer direction of resource elements of an uplink shared channel;
    performing a first frequency direction mapping that changes the first positions to a frequency direction of the resource elements and repeats the first layer direction mapping;
    repeating changing the first positions to a time direction of the resource elements and performing the first frequency direction mapping;
    determining second positions from among the resource elements available for second coded bit of data, based on the first positions of the mapped first coded bits, to avoid mapping the second coded bit to the first positions of the mapped first coded bits;
    performing a second layer direction mapping that maps the second coded bits of data to second positions in the layer direction;
    performing a second frequency direction mapping that repeats changing the second positions to the frequency direction and performing the second layer direction mapping;
    repeating changing the second positions to the time direction and performing the second frequency direction mapping; and
    transmitting the uplink shared channel.

3. A base station comprising:
a receiver that receives an uplink shared channel; and
a processor that decodes first coded bits of a Hybrid Automatic Repeat reQuest-Acknowledgement (HARQ-ACK) and second coded bit of data in resource elements of the uplink shared channel according to a mapping method,
wherein the first coded bits and the second coded bit are mapped to the resource elements according to the mapping method, and
the mapping method comprises:
 performing a first layer direction mapping that maps the first coded bits to first positions in a layer direction of the resource elements;
 performing a first frequency direction mapping that changes the first positions to a frequency direction of the resource elements and repeats the first layer direction mapping;
 repeating changing the first positions to a time direction of the resource elements and performing the first frequency direction mapping;
 determining second positions from among the resource elements available for the second coded bit, based on the first positions of the mapped first coded bits, to avoid mapping the second coded bit to the first positions of the mapped first coded bits;
 performing a second layer direction mapping that maps the second coded bits of data to second positions in the layer direction;
 performing a second frequency direction mapping that repeats changing the second positions to the frequency direction and performing the second layer direction mapping; and
 repeating changing the second positions to the time direction and performing the second frequency direction mapping.

4. A system comprising:
a terminal comprising:
 a processor that:
  perform a first layer direction mapping that maps first coded bits of a Hybrid Automatic Repeat reQuest-Acknowledgement (HARQ-ACK) to first positions in a layer direction of resource elements of an uplink shared channel;
  perform a first frequency direction mapping that changes the first positions to a frequency direction of the resource elements and repeats the first layer direction mapping;
  repeats changing the first positions to a time direction of the resource elements and performing the first frequency direction mapping;
  determines second positions from among the resource elements available for second coded bit of data, based on the first positions of the mapped first coded bits, to avoid mapping the second coded bit to the first positions of the mapped first coded bits;
  perform a second layer direction mapping that maps the second coded bits of data to second positions in the layer direction;
  perform a second frequency direction mapping that repeats changing the second positions to the frequency direction and performing the second layer direction mapping; and
  repeats changing the second positions to the time direction and performing the second frequency direction mapping; and
 a transmitter that transmits the uplink shared channel; and
a base station that receives the uplink shared channel.

* * * * *